: US011513032B2

(12) United States Patent
Lee et al.

(10) Patent No.: US 11,513,032 B2
(45) Date of Patent: Nov. 29, 2022

(54) SYSTEM OF CONDITION MONITORING OF SELF POWER-GENERATED BEARING MODULE

(71) Applicant: KOREA INSTITUTE OF SCIENCE AND TECHNOLOGY, Seoul (KR)

(72) Inventors: Yong Bok Lee, Seoul (KR); Wonil Kwak, Seoul (KR); Junsang Kong, Seoul (KR); Jungwan Kim, Seoul (KR); Yunseok Ha, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 414 days.

(21) Appl. No.: 16/792,886

(22) Filed: Feb. 18, 2020

(65) Prior Publication Data

US 2020/0271545 A1    Aug. 27, 2020

(30) Foreign Application Priority Data

Feb. 21, 2019  (KR) .......................... 10-2019-0020257

(51) Int. Cl.
*G01M 13/045* (2019.01)
*F16C 41/00* (2006.01)
(Continued)

(52) U.S. Cl.
CPC ......... *G01M 13/045* (2013.01); *F16C 41/004* (2013.01); *H02N 2/186* (2013.01); *H04W 4/38* (2018.02); *F16C 2233/00* (2013.01)

(58) Field of Classification Search
CPC ... G01M 13/045; G01M 13/04; F16C 41/004; F16C 2233/00; F16C 2202/36;
(Continued)

(56) References Cited

U.S. PATENT DOCUMENTS 6,259,372 B1 * 7/2001 Taranowski ........ G01M 13/045
340/539.1
6,899,178 B2 * 5/2005 Tubel ...................... E21B 47/07
166/313
(Continued)

FOREIGN PATENT DOCUMENTS

EP   3539835 A2   9/2019
JP   2003528292 A   9/2003
(Continued)

OTHER PUBLICATIONS

Brian T. Holm-Hansen et al., "Vibration Analysis of a Sensor-Integrated Ball Bearing," Transactions of the ASME, Journal of Vibration and Acoustics, Oct. 2000, pp. 384-392, vol. 122.
(Continued)

*Primary Examiner* — John K Kim
(74) *Attorney, Agent, or Firm* — Cantor Colburn LLP

(57) ABSTRACT

Provided is a system for real-time condition diagnosis of a bearing module including a self-power generation module installed in an outer ring of a bearing to generate electricity using vibration generated from a micro whirling motion of the bearing, a behavior detection unit installed in the bearing to detect behavior information of the bearing in real time, a wireless transmission module connected to the behavior detection unit to transmit the real-time detected behavior information of the bearing to an external device, and a condition diagnosis unit that receives the behavior information of the bearing transmitted from the wireless transmission module and diagnoses condition of the bearing in real time, wherein the real-time behavior information of the behavior detection unit installed in the bearing is transmitted through the electricity obtained by the self-power generation module.

7 Claims, 21 Drawing Sheets

(51) Int. Cl.
  *H02N 2/18* (2006.01)
  *H04W 4/38* (2018.01)
(58) Field of Classification Search
  CPC ...... F16C 19/06; F16C 19/527; F16C 41/008; F16C 17/246; F16C 19/00; H02N 2/186; H04W 4/38; G01P 15/00; H04B 1/02
  USPC .......................................................... 310/90
  See application file for complete search history.

(56) References Cited

U.S. PATENT DOCUMENTS

| | | | |
|---|---|---|---|
| 10,053,975 B2* | 8/2018 | Tubel | E21B 47/12 |
| 2005/0246150 A1 | 11/2005 | Shiromaru et al. | |
| 2013/0066594 A1* | 3/2013 | Ludlow | H02N 2/181 |
| | | | 702/188 |
| 2017/0212008 A1* | 7/2017 | Higashiyama | F16C 41/004 |
| 2018/0347548 A1 | 12/2018 | Potter et al. | |
| 2019/0040912 A1* | 2/2019 | Okamura | F16C 33/7816 |
| 2019/0121348 A1* | 4/2019 | Celia | G06N 20/00 |
| 2019/0137360 A1 | 5/2019 | Miyasaka et al. | |
| 2020/0271545 A1* | 8/2020 | Lee | F16C 19/527 |

FOREIGN PATENT DOCUMENTS

| | | |
|---|---|---|
| JP | 2017133580 A | 8/2017 |
| JP | 2018163178 A | 10/2018 |
| KR | 1020050042079 A | 5/2005 |
| KR | 1020180053884 A | 5/2018 |
| KR | 101901146 B1 | 9/2018 |
| WO | 0123861 A1 | 4/2001 |
| WO | 0201086 A2 | 1/2002 |

OTHER PUBLICATIONS

Dustin M. Etchison, "The Impact of Equipment Reliability on Human Safety," Oct. 20, 2017, https://production-technology.org/the-impact-of-equipment-reliability-on-human-safety.
Fredrik Haggstrom, "Energy Harvesting for Smart-Internet-Connected Bearings," Lulea University of Technology, Department of Computer Science, Electrical and Space Engineering, 2015, 94 pages, Sweden.
GE, Predix Platform, https://www.ge.com/digital/iiot-platform.
Justin J. Scheidler et al., "A review of noise and vibration control technologies for rotorcraft transmissions," inter. noise Hamburg, 2016, 12 pages.
SKF, Sensor bearing units, https://www.skf.com/us/products/bearings-units-housings/engineered-products/sensorbearing-units.
SKF, SKF Insight, Next generation condition monitoring, https://www.skf.com/group/products/condition-monitoring/skfinsight.html.
V. K. Rai et al., "Bearing fault diagnosis using FFT of intrinsic mode functions in Hilbert-Huang transform," Mechanical Systems and Signal Processing, 2007, pp. 2607-2615, vol. 21, Elsevier Ltd.

* cited by examiner

SYSTEM OF CONDITION MONITORING OF SELF POWER-GENERATED BEARING MODULE

DESCRIPTION OF GOVERNMENT-FUNDED RESEARCH AND DEVELOPMENT

This research is conducted by Korea Institute of Science and Technology and funded by individual basic research (R&D) (Core technology development for extreme environment ball bearings with improved reliability and smart ball bearings, No. 1711068522) in the National Research Foundation of Korea, the Ministry of Science and ICT of the Republic of Korea.

CROSS-REFERENCE TO RELATED APPLICATION

This application claims priority to Korean Patent Application No. 10-2019-0020257, filed on Feb. 21, 2019, and all the benefits accruing therefrom under 35 U.S.C. § 119, the contents of which in its entirety are herein incorporated by reference.

BACKGROUND

1. Field

The present disclosure relates to a system for condition diagnosis of a bearing module, and more particularly, to a condition diagnosis system for enabling real-time condition diagnosis and monitoring of a ball bearing having a fractal structure for self-power generation.

2. Description of the Related Art

With the industrial development, rotating machinery moves toward smaller size and higher speed. In keeping up with this trend, reliability and stability requirements of bearings are stricter, and many studies are being made to meet the requirements. Particularly, the field of industry has a tendency of research and development from preventive maintenance technology to predictive maintenance technology to improve system reliability and stability and reduce maintenance and repair costs.

The preventive maintenance technology needs lots of modules, resulting in the increased system volume. Additionally, external power supply is necessary to implement the preventive maintenance technology. The above invention produces necessary power for the preventive maintenance technology itself through PZT inserted into a fractal ring and inserts a sensor into an outer ring of the bearing to reduce the volume.

FIG. 1 shows earlier modeling for condition diagnosis of a bearing by inserting a general ball bearing sensor. Because a general ball bearing holds and rotates with the rotating shaft, it is difficult to predict the condition of the bearing. Accordingly, when a sensor is mounted on the outer side of the outer ring, it is possible to monitor the condition of the bearing in real time, and accordingly, a user can check the condition of the bearing and prevent damage of rotating machinery.

FIG. 2 shows a sensor module mounted in motors and automobile brake systems using bearings to detect motions. This module can provide users with real-time monitoring systems, but since external power supply is necessary, it requires an electrical wire for power supply and a wire for data transmission. By this reason, there are limitations in applications due to the volume of the system when using by mounting in bearings present within rotating systems. Additionally, currently available sensor modules only detect motions (on/off), so there is a need for development of a sensor module for transmitting kinetic information about the condition of the bearing.

SUMMARY

The present disclosure is designed to solve the above-described problem, and therefore the present disclosure is directed to providing a system for real-time condition diagnosis and monitoring of a ball bearing having a fractal structure for self power-generation.

To solve the above-described problem, a system for real-time condition diagnosis of a bearing module of the present disclosure includes a self-power generation module installed in an outer ring of a bearing to generate electricity using vibration generated from a micro whirling motion of the bearing, a behavior detection unit installed in the bearing to detect behavior information of the bearing in real time, a wireless transmission module connected to the behavior detection unit to transmit the real-time detected behavior information of the bearing to an external device, and a condition diagnosis unit that receives the behavior information of the bearing transmitted from the wireless transmission module and diagnoses condition of the bearing in real time, wherein the real-time behavior information of the behavior detection unit installed in the bearing is transmitted through the electricity obtained by the self-power generation module.

According to an example related to the present disclosure, the behavior detection unit may be an accelerometer sensor installed in the bearing to detect the behavior information generated by rotation and vibration of the bearing.

According to another example related to the present disclosure, the self-power generation module may include a housing that is in contact with the outer ring of the bearing to receive the vibration generated from the micro whirling motion of the bearing and has a receiving space therein, a flexible structure that is disposed in the receiving space while being in contact with an inner circumference of the housing to convert the vibration into a radial direction, and a piezoelectric element that is installed between the housing and the flexible structure and disposed near the receiving space and deforms upon receiving the vibration converted in the radial direction from the flexible structure, thereby producing electricity.

The flexible structure may include a first element that is formed in an arc shape and installed in the piezoelectric element with two ends being connected to one surface of the housing, and a second element that is formed in an arc shape and disposed in contact between the first element and the other surface of the housing.

A plurality of piezoelectric elements may be provided and the plurality of piezoelectric elements may be arranged in the housing, spaced apart from each other, a plurality of first elements may be provided and the plurality of first elements may be spaced apart from each other and have two ends each installed in the plurality of piezoelectric elements, and a plurality of second elements may be provided and the plurality of second elements may have two ends in contact with adjacent first elements.

The condition diagnosis unit may be configured to receive the behavior information of the bearing detected by the accelerometer sensor from the wireless transmission module, and may include a damage diagnosis module to diagnose damage of the bearing through a frequency analysis algorithm based on the behavior information of the bearing and a predictive repair diagnosis module to predict repair.

The damage diagnosis module may perform Ball Pass Frequency of the Outer race (BPFO), Ball Pass Frequency of the Inner race (BPFI), Fundamental Train Frequency (FTF) and Ball Spin Frequency (BSF) through Fast Fourier Transform (FFT).

According to still another example related to the present disclosure, the condition diagnosis unit may be implemented through a mobile terminal, and the wireless transmission module may be a wireless Internet module or a short range communication module that enables wireless communication with the mobile terminal.

The mobile terminal may be a smart phone in which an application including the condition diagnosis unit is installed, and the application may have a damage diagnosis module to diagnose damage of the bearing through a frequency analysis algorithm based on the behavior information of the bearing transmitted from the wireless transmission module and a predictive repair diagnosis module to predict repair.

DETAILED DESCRIPTION

Hereinafter, the disclosed embodiments will be described in detail with reference to the accompanying drawings, and identical or similar elements are given identical or similar reference signs and redundant descriptions are omitted herein. As used herein, the suffix "unit" in the elements is only given or used to ease the drafting of the specification, and does not have any meaning or role for distinguishing one from another itself. Additionally, in describing the embodiments disclosed herein, when a certain detailed description of relevant known technology is determined to render the key subject matter of the disclosed embodiments ambiguous, the detailed description is omitted herein. Additionally, the accompanying drawings are provided for an easy understanding of the disclosed embodiments, and the technical spirit disclosed herein is not limited by the accompanying drawings, and it should be understood that the present disclosure covers all modifications, equivalents or alternatives within the spirit and technical scope of the present disclosure.

The terms "first", "second", and the like may be used to describe various elements, but the elements are not limited by the terms. These terms are used to distinguish one element from another.

It will be further understood that when an element is referred to as being "connected to" another element, it can be directly connected to the other element or intervening elements may be present.

As used herein, the singular forms are intended to include the plural forms as well, unless the context clearly indicates otherwise.

It will be understood that the term "comprises" or "includes" when used in this specification, specifies the presence of stated features, integers, steps, operations, elements, components or groups thereof, but does not preclude the presence or addition of one or more other features, integers, steps, operations, elements, components, or groups thereof.

Figure 1:
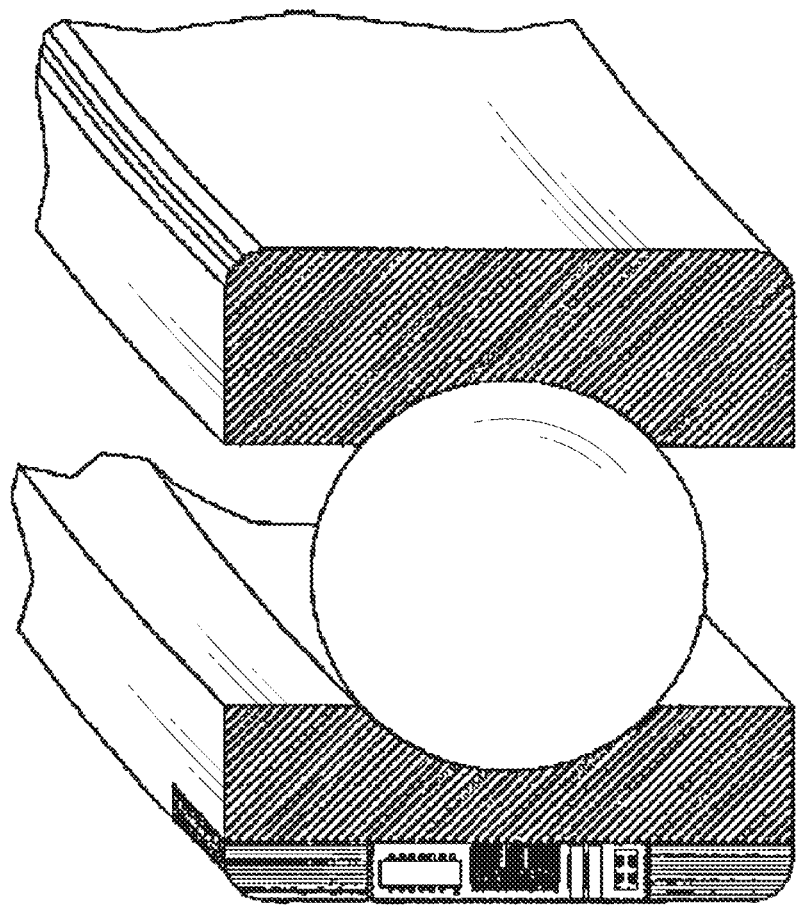
FIG. 1 is a conceptual diagram of a sensor inserted into a bearing according to related art.
Figure 2:
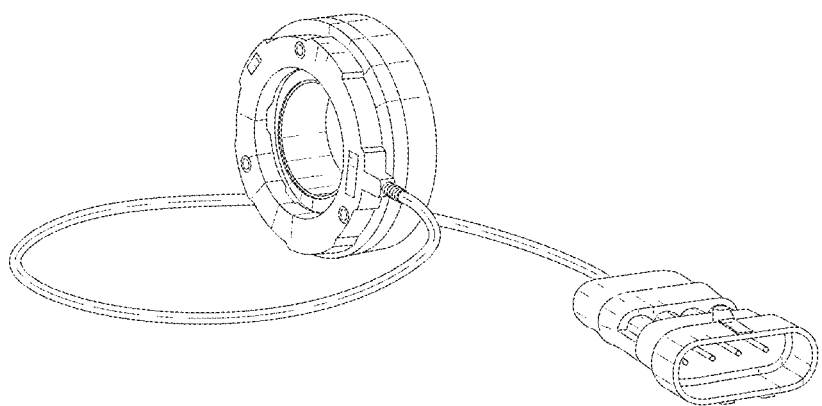
FIG. 2 is a perspective view showing a sensor bearing according to related art.
Figure 3A:
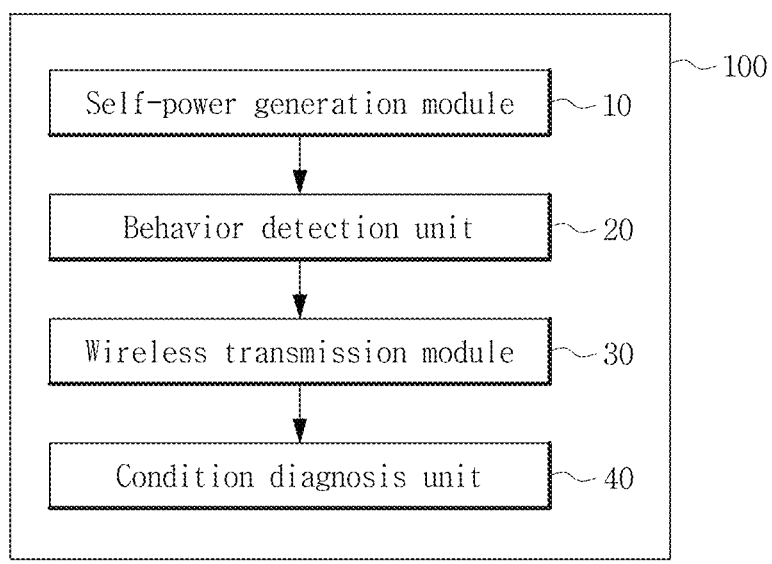
FIG. 3A is a block diagram showing a system for real-time condition diagnosis of a bearing module of the present disclosure.
Figure 3B:
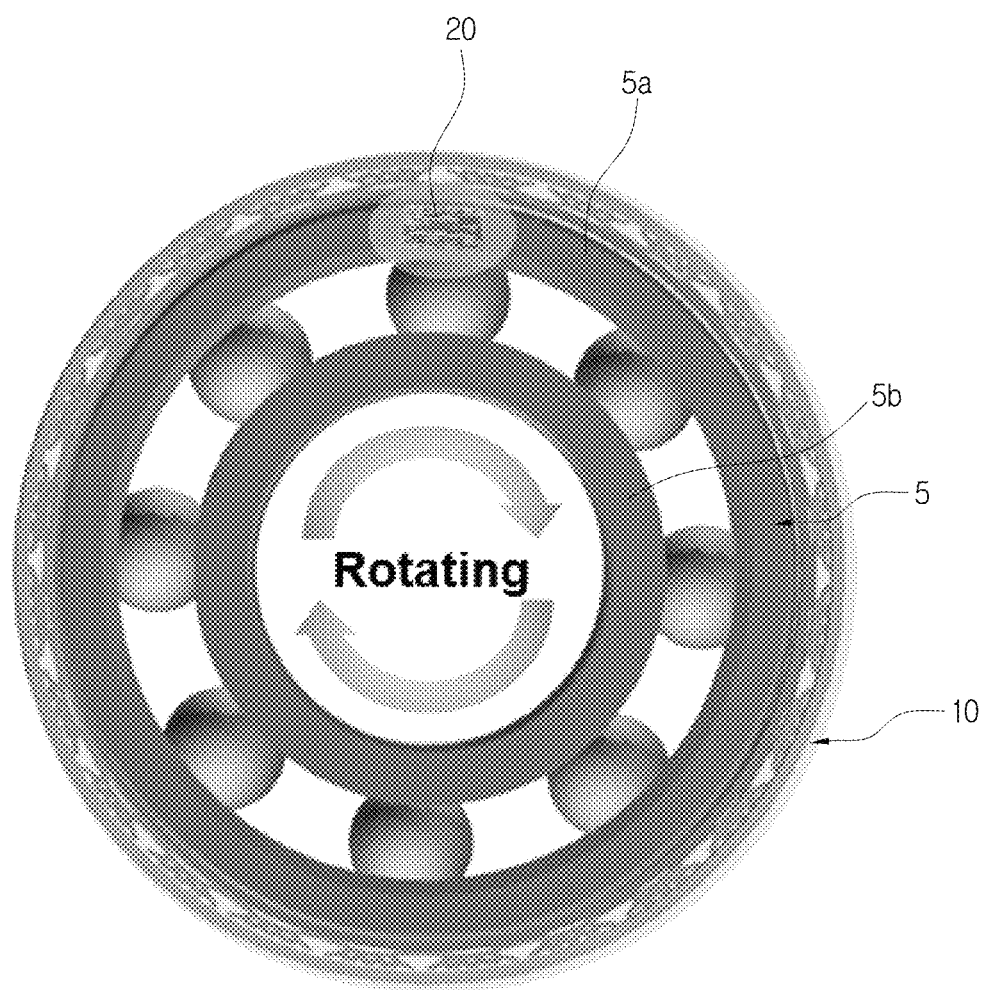
FIG. 3B is a conceptual diagram showing an example of a self-power generation module and a behavior detection unit of the present disclosure installed in a ball bearing.
Figure 3C:
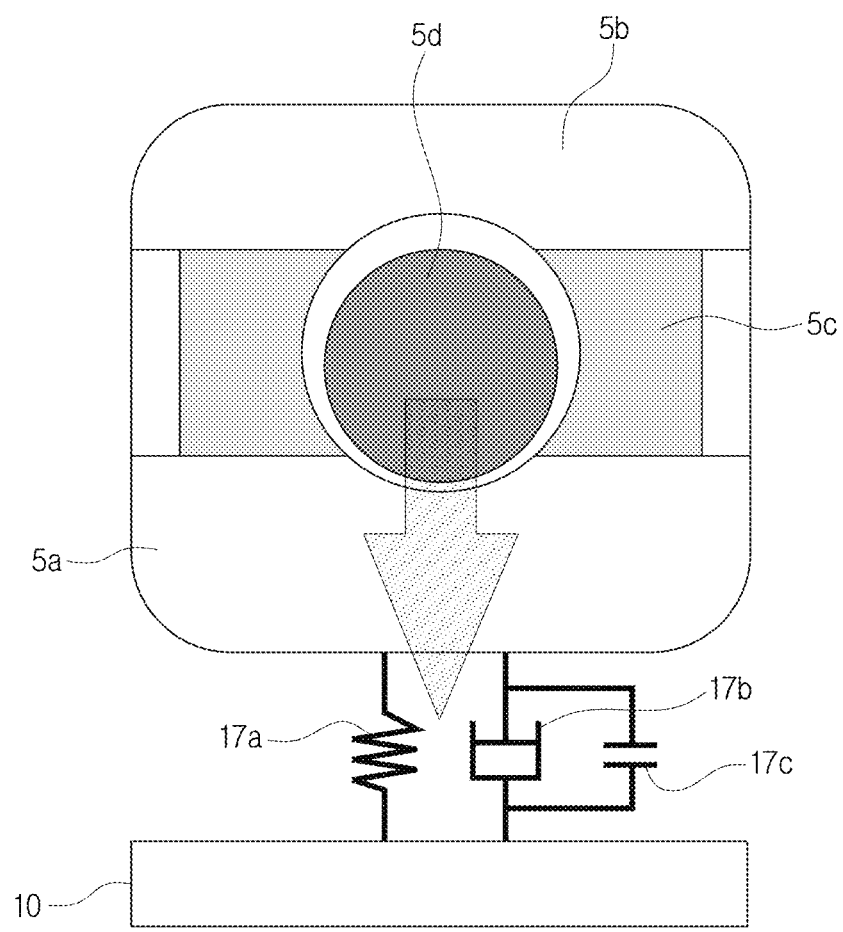
FIG. 3C is a conceptual diagram showing an elastic element, a damping element and a battery connected to a self-power generation module.
Figure 3D:
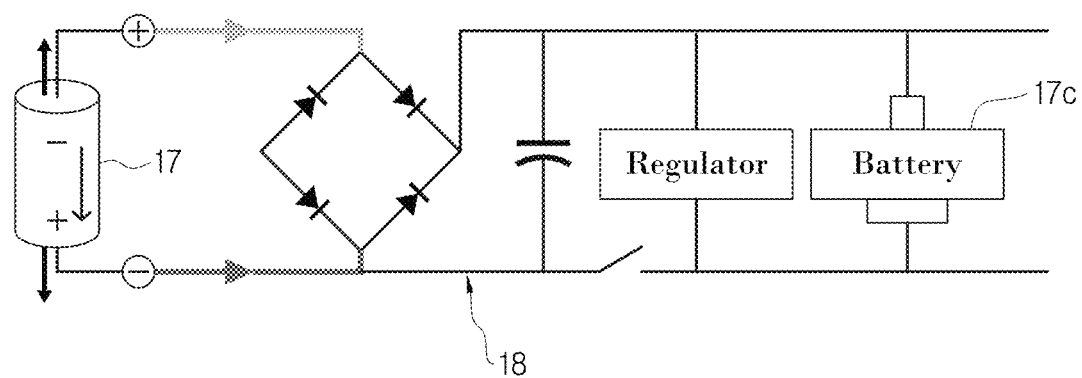
FIG. 3D is a conceptual diagram of a circuit and a battery connected to a piezoelectric element.
Figure 3E:
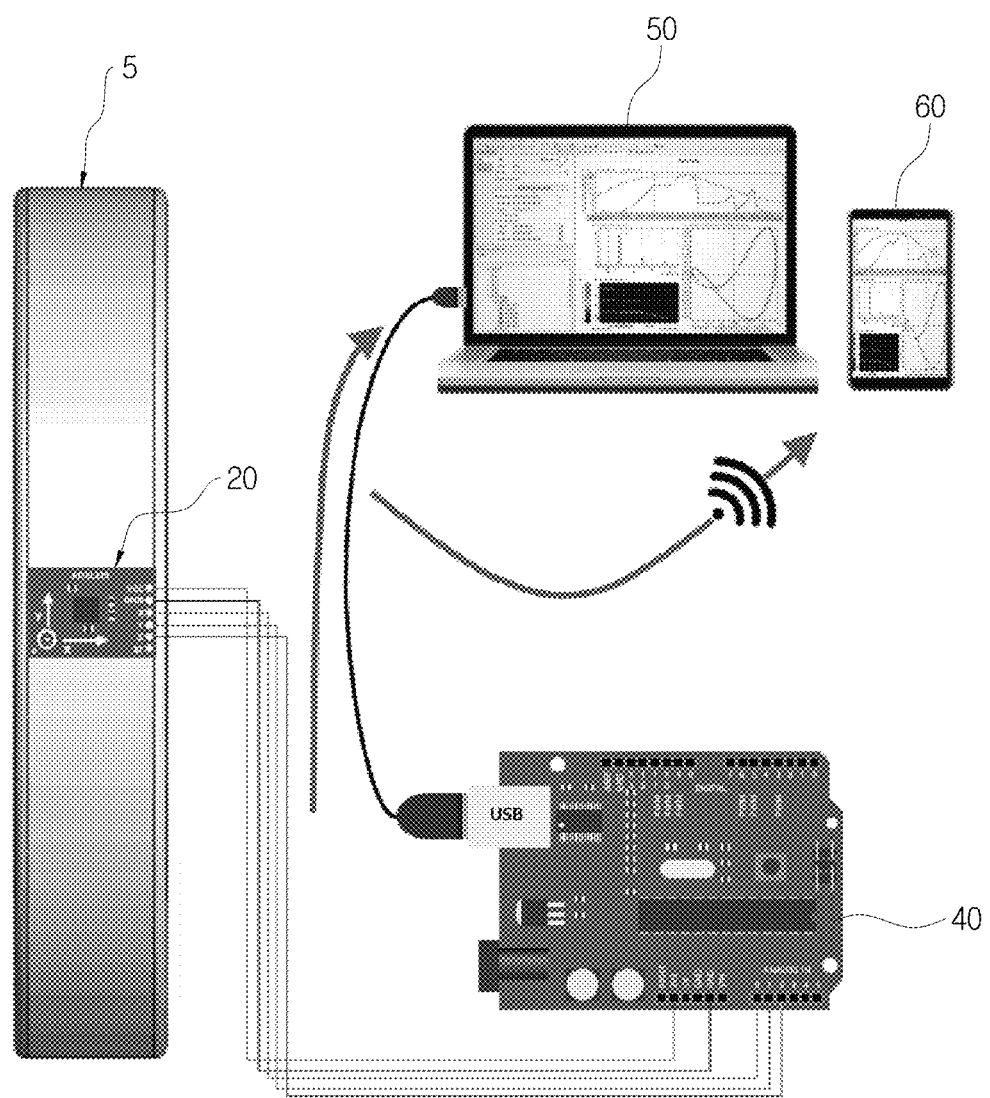
FIG. 3E is a conceptual diagram showing an example of a behavior detection unit and a condition diagnosis unit of the present disclosure installed in a ball bearing.

FIG. 3A is a block diagram showing a system 100 for real-time condition diagnosis of a bearing module of the present disclosure, FIG. 3B is a conceptual diagram showing an example of a self-power generation module 10 and a behavior detection unit 20 of the present disclosure installed in a ball bearing, FIG. 3C is a conceptual diagram showing an elastic element 17a, a damping element 17b and a battery 17c connected to the self-power generation module 10, and FIG. 3D is a conceptual diagram of a circuit 18 and the battery 17c connected to a piezoelectric element 17. Additionally, FIG. 3E is a conceptual diagram showing an example of a behavior detection unit 20 and a condition diagnosis unit 40 of the present disclosure installed in the ball bearing.

First, the system 100 for real-time condition diagnosis of a bearing module of the present disclosure will be described with reference to FIGS. 3A to 3E.

Referring to FIG. 3A, the system 100 for real-time condition diagnosis of a bearing module of the present disclosure includes the self-power generation module 10, the behavior detection unit 20, a wireless transmission module 30 and the condition diagnosis unit 40.

The self-power generation module 10 is a component for power generation of bearing rotating vibration that is installed in an outer ring 5a of the bearing 5 (FIG. 3B) to generate power using vibrations generated from micro whirling motions of the bearing 5.

The self-power generation module 10 of the present disclosure produces electricity using vibrations generated using radial and tangential vibrations of the bearing and operates the behavior detection unit 20 in itself.

In the present disclosure, the bearing may be, for example, the ball bearing 5. The ball bearing 5 is connected to a rotating shaft and makes micro whirling motions by power transmitted from the rotating shaft.

The self-power generation module 10 converts vibrations transmitted from the bearing 5 to radial forces.

The self-power generation module 10 may be a fractal structure. Additionally, the self-power generation module 10 may include a housing 11, a flexible structure 14 and the piezoelectric element 17. The detailed structure of the self-power generation module 10 will be provided below in the description of FIGS. 8 to 12B.

The behavior detection unit 20 is installed in the bearing to detect behavior information of the bearing in real time.

The behavior detection unit 20 may be an accelerometer sensor installed in the bearing to detect the behavior information generated by rotation and vibration of the bearing. Referring to FIG. 3B, shown is an example of the behavior detection unit 20 installed within the outer ring 5a of the bearing, but the behavior detection unit 20 is not necessarily limited thereto.

The behavior detection unit 20 operates by electricity generated by the self-power generation module 10 to detect the behavior information of the bearing. Referring to FIG. 3E, the information is transmitted by the wireless transmission module 30 and diagnosed by the condition diagnosis unit 40, and the diagnosed behavior information of the bearing is displayed to a user through a laptop computer 50 or a smart phone 60.

Although not clearly shown in the drawing, the wireless transmission module 30 is connected to the behavior detection unit 20 to transmit the real-time detected behavior information of the bearing to an external device.

For example, the wireless transmission module 30 may be connected to enable communication with the behavior detection unit 20.

The condition diagnosis unit 40 receives the behavior information of the bearing transmitted from the wireless transmission module 30 and diagnoses the condition of the bearing in real time.

For example, the condition diagnosis unit 40 may be a Micro Controller Unit (MCU).

The condition diagnosis unit 40 may receive the behavior information of the bearing detected by the accelerometer sensor from the wireless transmission module 30. The condition diagnosis unit 40 may have a damage diagnosis module to diagnose damage of the bearing through a frequency analysis algorithm based on the behavior information of the bearing and a predictive repair diagnosis module to predict repair.

The damage diagnosis module may perform the frequency analysis algorithm such as Ball Pass Frequency of the Outer race (BPFO), Ball Pass Frequency of the Inner race (BPFI), Fundamental Train Frequency (FTF) and Ball Spin Frequency (BSF) through Fast Fourier Transform (FFT).

Figure 6A:
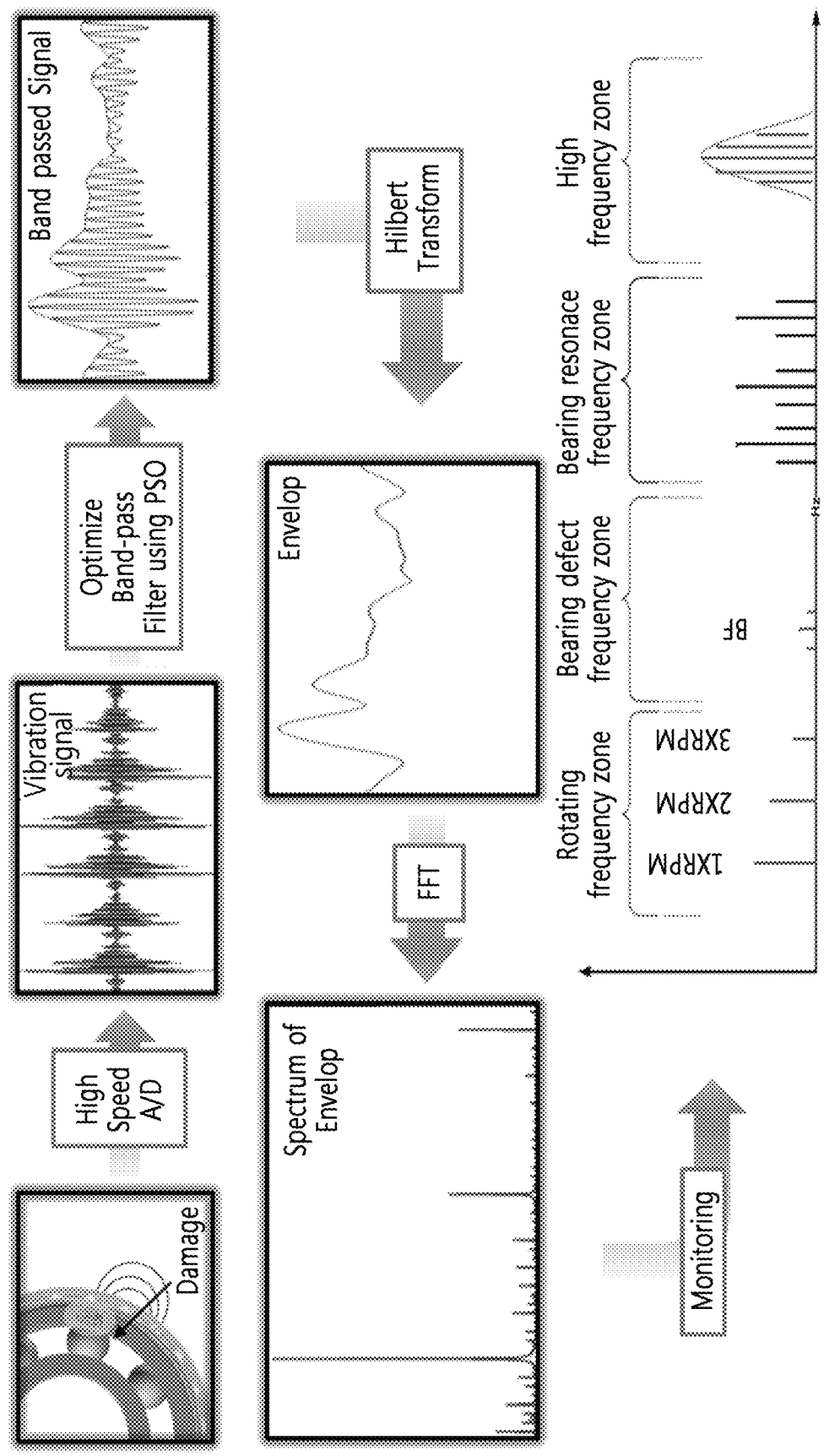
FIG. 6A shows an algorithm for condition diagnosis of a bearing.
Figure 6B:
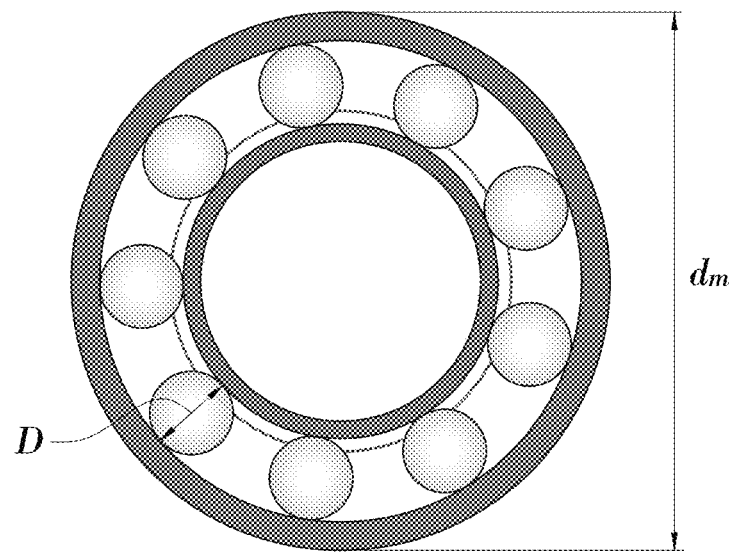
FIG. 6B is a conceptual diagram showing parameters of a bearing used in the algorithm of FIG. 6A.

BPFO is derived from $0.5*RPM*Z*\{1-(D/d_m)*\cos(\alpha°)\}$, BPFI from $0.5*RPM*Z*)\{1+(D/\alpha°)*\cos(\alpha°)\}$, FTF from $0.5*RPM*\{1-(D/d_m)*\cos(\alpha°)\}$, and BSF from $0.5*RPM*(d_m/D)*\{1-(D/d_m)*\cos(\alpha°)\}^2$. Referring to FIG. 6B, in the above equations, RPM is RPM of the bearing, Z is the number of balls in the ball bearing, $\alpha°$ is the contact angle between the ball bearing and the self-power generation module 10, D is the diameter of the ball, and $d_m$ is the diameter of the ball bearing.

For example, the condition diagnosis unit 40 of the present disclosure may be implemented through a mobile terminal, and the wireless transmission module 30 may be a wireless Internet module or a short range communication module to enable wireless communication with the mobile terminal.

Figure 7A:
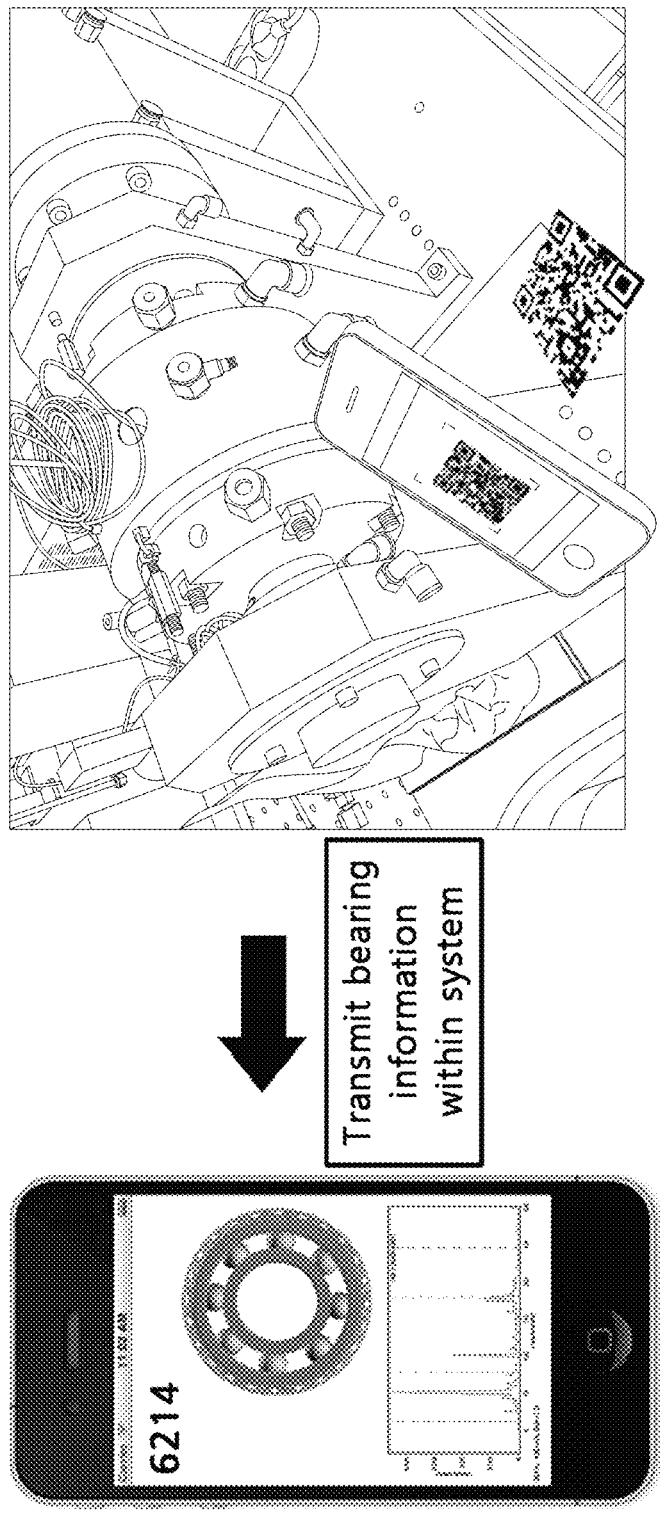
FIG. 7A is a conceptual diagram showing an example of recognizing QR code and transmitting behavior information of a bearing in a system.
Figure 7B:
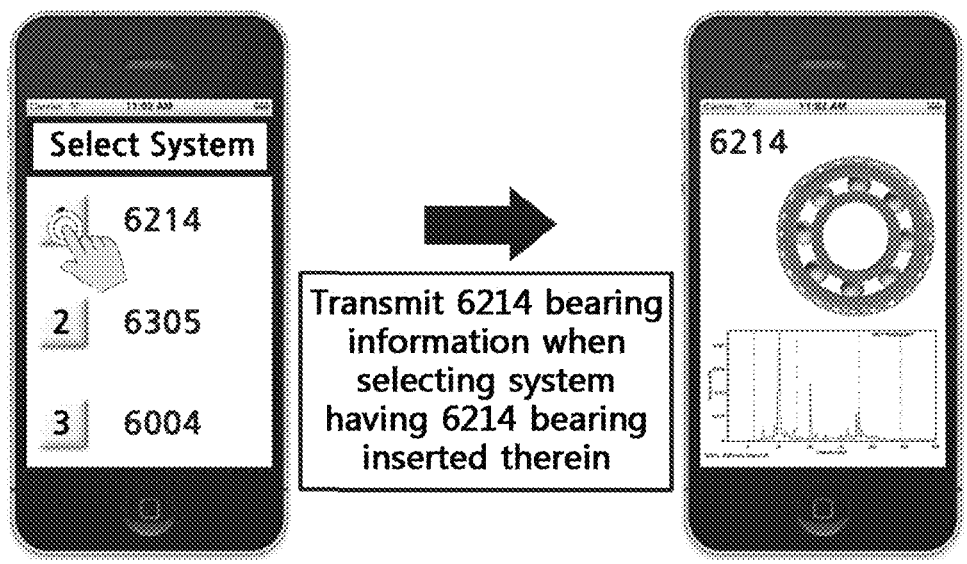
FIG. 7B is a conceptual diagram showing an example of transmitting behavior information of a bearing when selecting a system having the bearing inserted therein.

FIG. 7A shows an example of recognizing QR code and transmitting the behavior information of the bearing in the system, and FIG. 7B shows an example of transmitting the behavior information of the bearing when selecting the system having the bearing inserted therein.

In this instance, the mobile terminal described in the present disclosure may include a mobile phone, a smart phone, a laptop computer, a digital broadcast terminal, a personal digital assistant (PDA), a portable multimedia player (PMP), a navigation, a slate PC, a tablet PC, an ultrabook, a wearable device, for example, a smartwatch, a smart glass and a head mounted display (HMD).

The mobile terminal of the present disclosure may be a smart phone in which an application including the condition diagnosis unit 40 is installed. Additionally, the application installed in the smart phone may have a damage diagnosis module and a predictive repair diagnosis module, and the damage diagnosis module is a module for damage diagnosis of the bearing through the frequency analysis algorithm based on the behavior information of the bearing, and the predictive repair diagnosis module is a module that predicts repair when the bearing is damaged.

Additionally, the wireless Internet module described in the present disclosure refers to a module for wireless Internet access, and may be included inside or outside the mobile terminal. The wireless Internet module is configured to transmit and receive a wireless signal in a communication network according to wireless Internet technologies. The wireless Internet technology includes, for example, Wireless LAN (WLAN), Wireless-Fidelity (Wi-Fi), Wireless Fidelity (Wi-Fi) Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE) and Long Term Evolution-Advanced (LTE-A), and the wireless Internet module transmits and receives data according to at least one wireless Internet technology in the range including Internet technologies not enumerated herein.

In the present disclosure, the wireless Internet module may be Wi-Fi.

Additionally, the short range communication module described in the present disclosure is for short range communication, and may support short range communication using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, Wireless Universal Serial Bus (Wireless USB) technologies.

The short range communication module may support wireless communication between the mobile terminal and a wireless communication system, between the mobile terminal and another mobile terminal, or between networks in which the mobile terminal and another mobile terminal (or an external server) are located via short range wireless area networks. The short range wireless communication network may be short range wireless personal area networks.

In the present disclosure, the short range communication module may be Bluetooth.

The system 100 for real-time condition diagnosis of a bearing module of the present disclosure transmits the real-time behavior information of the behavior detection unit 20 installed in the bearing through electricity obtained by the self-power generation module 10.

Referring to FIGS. 3B to 3D, vibrations produced by the bearing are transmitted to the housing 11 (FIG. 8 and subsequent figures), focused stress is applied to the piezoelectric element to produce power by the self-power generation module 10 using the vibrations transmitted from the housing 11, and the power produced by the piezoelectric element is stored in the form of the battery 17c through the rectifier circuit 18 or operates the behavior detection unit 20 inserted into the outer ring 5a of the bearing. The power produced by the self-power generation module 10 should be sufficient to operate the behavior detection unit 20, and an amount of power generated by one piezoelectric element through the structure is a maximum of 1.0-1.2V and is close to an amount of voltage 1.68-1.83V that is enough to operate the behavior detection unit 20 for condition diagnosis of the bearing.

Figure 5A:
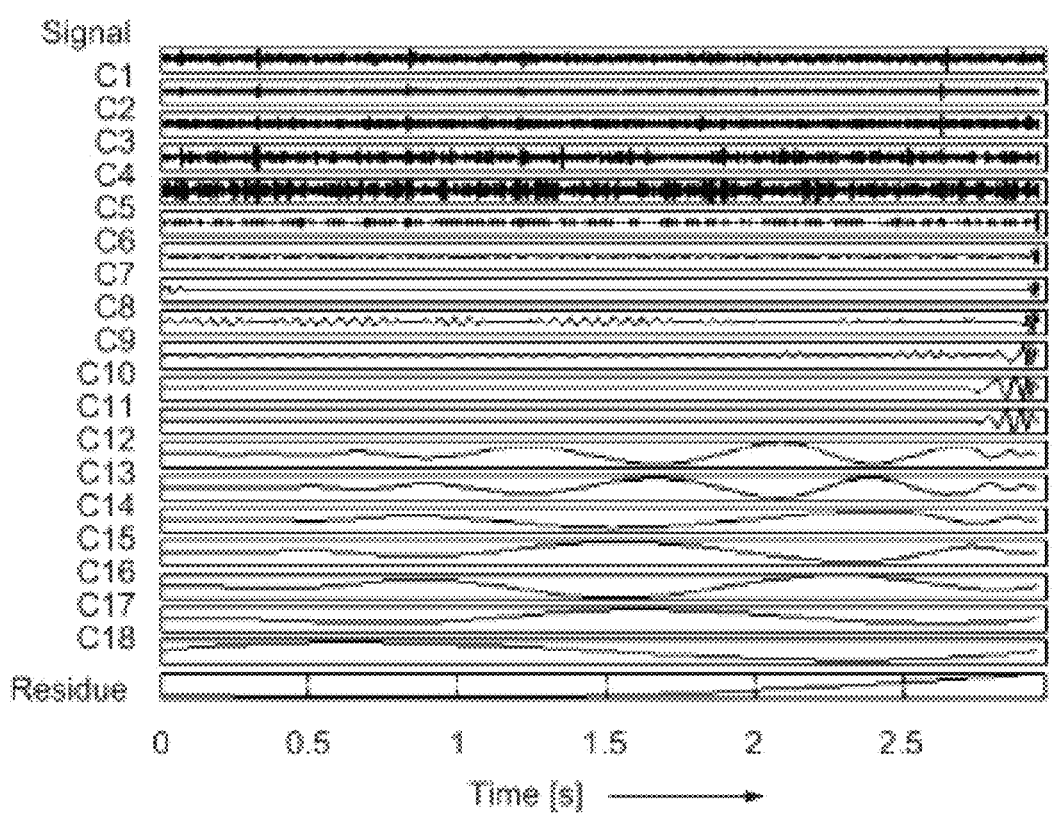
FIGS. 5A and 5B are graphs showing an example of bearing condition diagnosis by bearing frequency feature analysis.
Figure 5B:
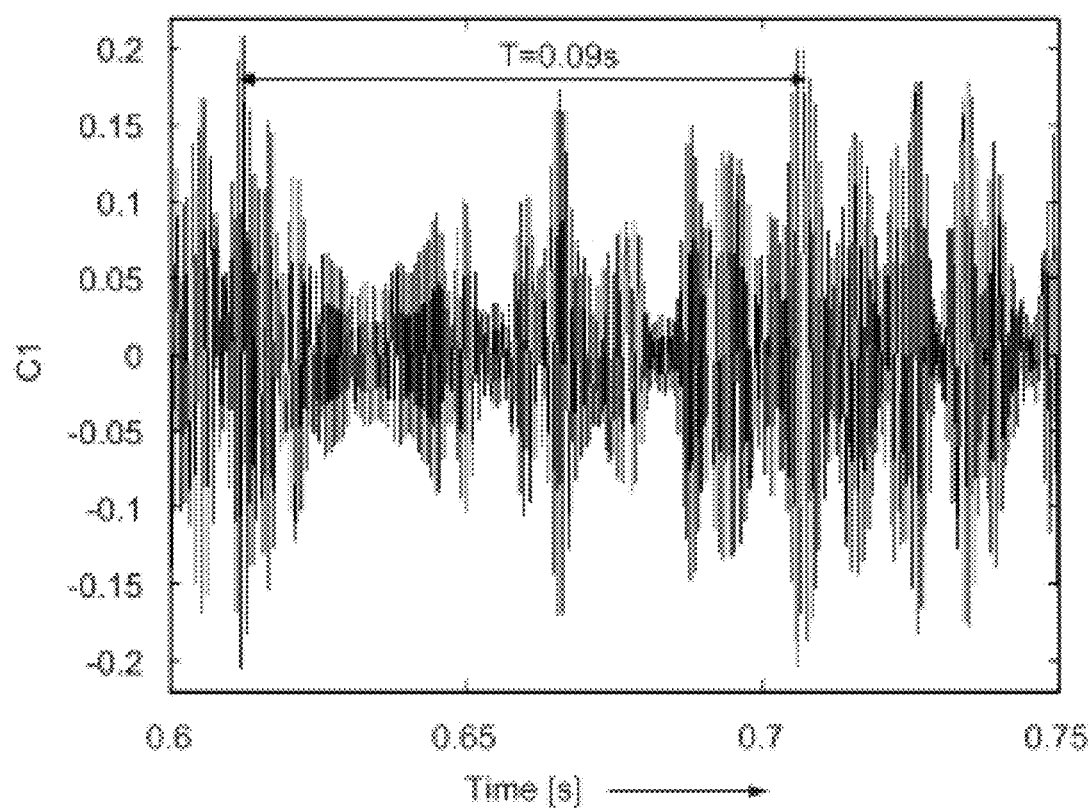

FIG. 5 is a graph showing damage diagnosis of the bearing by post-processing of data collected from the bearing. The graph of FIG. 5 is shown through signal analysis when there is no damage in the bearing. As the signal analysis only needs to analyze the bearing damage frequency, a wireless bearing module has an algorithm to allow the user to diagnose the condition of the bearing and maintain and repair later.

Hereinafter, the structure of the self-power generation module 10 will be described in more detail with reference to FIGS. 8 to 12B.

The housing 11 may be in contact with the outer ring 5a of the bearing to receive vibrations from micro whirling motions of the bearing, and may have therein a receiving space 11c in which the flexible structure 14 as described below is disposed. The housing 11 may be, for example, a vibration ring.

Figure 8:
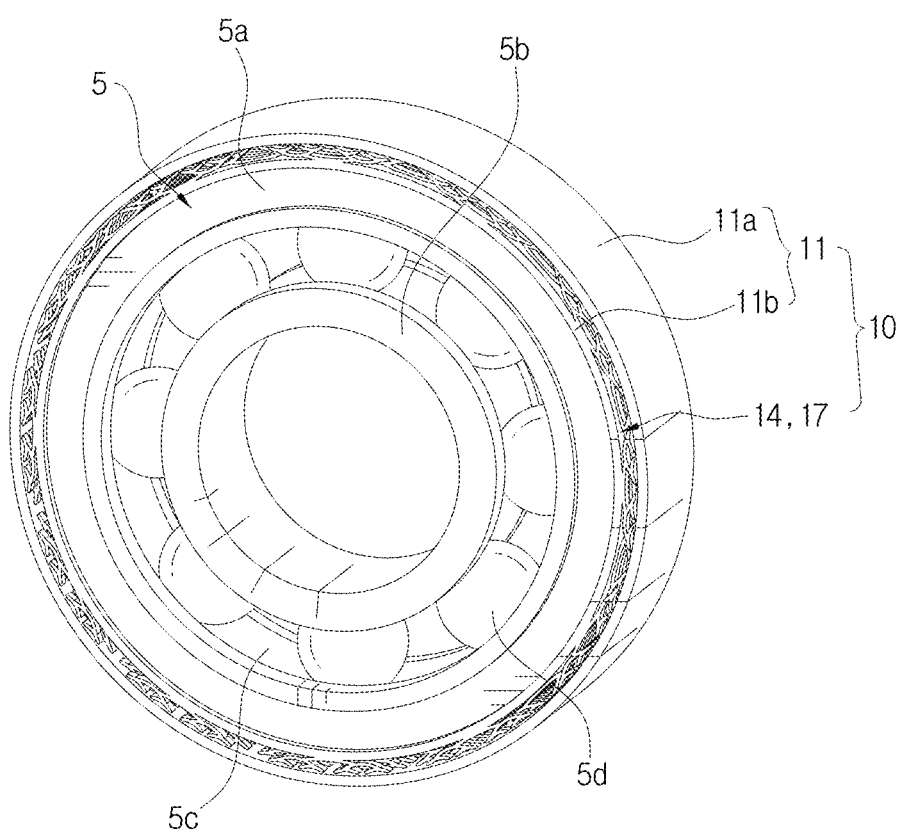
FIG. 8 is a perspective view showing an example of a self-power generation module of the present disclosure installed in a ball bearing.

Referring to FIG. 8, shown is an example of contact between the housing 11 and the outer ring 5a of the bearing 5.

Figure 10:
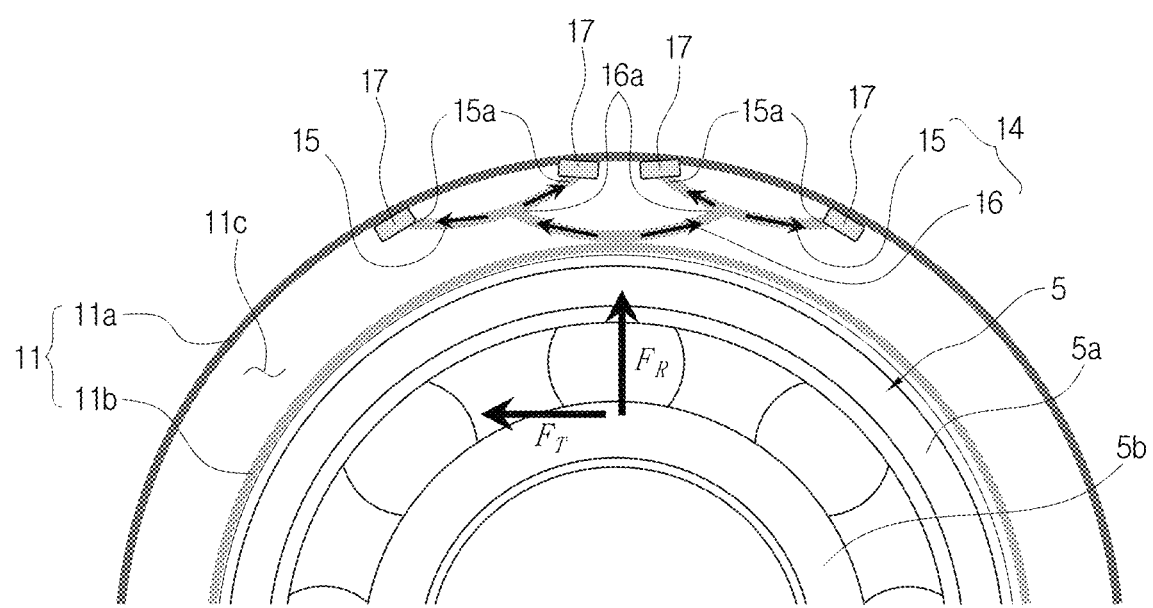
FIG. 10 is a partial cross-sectional view showing a flexible structure and a piezoelectric element of a self-power generation module of the present disclosure.

As shown in FIG. 10, shown is an example in which the housing 11 may include an outer ring 11a and an inner ring 11b, and the receiving space 11c in which the flexible structure 14 as described below is installed may be provided between the outer ring 11a and the inner ring 11b.

Figure 9:
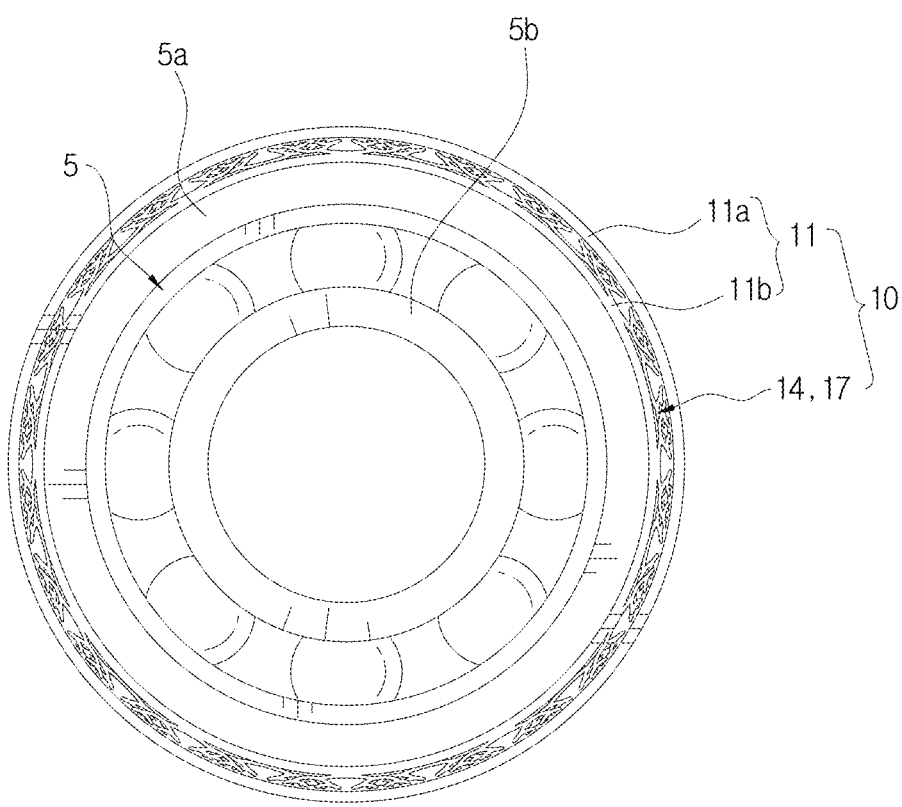
FIG. 9 is a front view showing an example of a self-power generation module of the present disclosure installed in a ball bearing.

Additionally, as shown in FIGS. 8 and 9, the housing 11 may be a ring structure, and may have a structure that is easy to insert it into the outer ring 5a of the bearing 5. When the housing 11 is a ring structure, the receiving space 11c may be formed in the circumferential direction of the bearing 5.

In this instance, the housing 11 may be made of a material having an elastic property to transmit the vibrations generated by the micro whirling motions of the bearing 5 while not being damaged by the vibrations.

The flexible structure 14 may be disposed in the receiving space 11c while being in contact with the inner circumstance of the housing 11 to convert the vibrations into the radial direction.

In more detail, the flexible structure 14 is disposed in the receiving space 11c of the housing 11 while being in contact with the inner circumstance of the housing 11, and receives the vibrations generated by the micro whirling motions of the bearing 5 and converts to the radial forces $F_T$, $F_R$ shown in FIG. 10. Additionally, the flexible structure 14 damps the converted radial forces.

The flexible structure 14 may include first and second elements 15, 16.

The first element 15 may be formed in an arc shape, and installed in the piezoelectric element with two ends 15a connected to one surface of the housing 11.

In the same way as the first element 15, the second element 16 may be formed in an arc shape, and disposed in contact with the first element 15 and the other surface of the housing 11.

Hereinafter, the flexible structure 14 will be described in more detail.

The first element 15 may be formed in an arc shape, and installed in the piezoelectric element with two ends 15a being connected to one surface of the housing 11. For example, the first element 15 may be coupled in surface contact with the piezoelectric element.

Additionally, the second element 16 may be formed in an arc shape, and disposed in contact between the first element 15 and the other surface of the housing 11.

Two ends 16a of the second element 16 may be in contact with part between the two ends 15a of the first element 15, and part between the two ends 16a of the second element 16 may be in contact with the other surface of the housing 11.

Although FIG. 10 shows two first elements 15 and one second element 16 within the housing 11, but this is simply shown for understanding of the present disclosure, and as in FIGS. 8 and 9, the shape of the first and second elements 15, 16 may have a structure in which the first and second elements 15, 16 are repeatedly arranged along the direction of the arc.

Referring to FIG. 10, shown is an example in which the plurality of first elements 15 is spaced apart from each other in the receiving space 11c of the housing 11, and the two ends 15a of the first element 15 are in contact with the plurality of piezoelectric elements and connected to the outer ring 11a of the housing 11. Additionally, FIG. 10 shows an example in which the two ends 16a of the second element 16 are in contact with the adjacent first elements 15.

Referring to FIG. 10, a plurality of second elements 16 may be also provided, and the two ends 16a of the plurality of second elements 16 may be in contact with the adjacent first elements 15. Additionally, part between the two ends 16a of the second element 16 may be in contact with the inner ring 11b of the housing 11.

The first element 15 and the piezoelectric element, the first element 15 and the second element 16, and the second element 16 and the inner ring 11b of the housing 11 may be connected, for example, via bonding.

When the receiving space 11c of the housing 11 is formed in the circumferential direction, the first and second elements 15, 16 may be repeatedly arranged in the circumferential direction within the receiving space.

Additionally, when the receiving space 11c of the housing 11 is formed in the circumferential direction, the first and second elements 15, 16 may be arranged in the circumferential direction and a direction perpendicular to the circumferential direction within the receiving space 11c.

Referring to FIGS. 8 and 9, shown is an example in which the first and second elements 15, 16 are arranged in the circumferential direction and a direction perpendicular to the circumferential direction within the receiving space 11c of the housing 11.

In this instance, the thickness, length and number of repetition of each of the first and second elements 15, 16 may be set, taking into account the intensity and direction of the whirling motion forces transmitted from the bearing 5, to ensure the structural stability of the entire system including the self-power generation module 10 and the bearing 5 of the present disclosure.

The piezoelectric element 17 may be configured to deform upon receiving the vibrations converted in the radial direction from the flexible structure 14, thereby producing electricity. Additionally, as shown in FIG. 10, the piezoelectric element 17 may be installed between the housing 11 and the flexible structure 14 such that the piezoelectric element 17 is in close contact with the receiving space 11c.

In more detail, the piezoelectric element 17 is installed between the housing 11 and the flexible structure 14 such that the piezoelectric element 17 is in close contact with the receiving space 11c. For example, the piezoelectric element 17 may be in surface contact with the flexible structure 14.

Additionally, the piezoelectric element 17 is configured to deform upon receiving the vibrations converted in the radial direction from the flexible structure 14, thereby producing electricity.

Referring to FIG. 10, shown is an example of the piezoelectric element 17 installed between the inner circumference of the outer ring of the housing 11 and the first element 15.

Additionally, the piezoelectric element 17 may be installed in a holder (not shown) coupled to the outer ring of the housing 11. Although not clearly shown in FIG. 10, the holder may be inserted into the outer ring of the housing 11 near the receiving space 11c, and when the piezoelectric element 17 is inserted into the holder, the piezoelectric element 17 may be installed in the housing 11. As the piezoelectric element 17 is coupled to the holder, it is possible to protect the piezoelectric element 17, and prevent the piezoelectric element 17 from sliding in the tangential direction from the receiving space 11c of the housing 11 and from being damaged.

A plurality of piezoelectric elements 17 may be provided, and the plurality of piezoelectric elements 17 may be arranged in the housing 11, spaced apart from each other.

For example, the piezoelectric element 17 produces electricity by compressive and tensile deformation in the radial direction upon receiving the vibrations transmitted from the bearing 5.

Figure 4A:
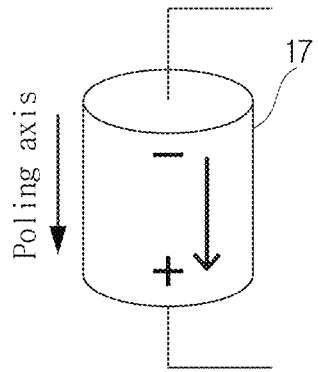
FIG. 4A is a conceptual diagram showing a piezoelectric element before deformation.
Figure 4B:
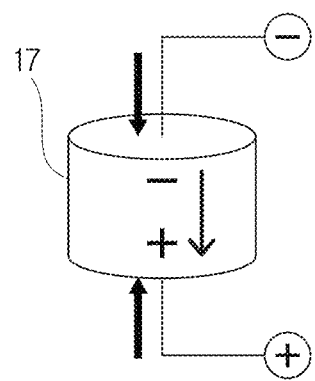
FIG. 4B is a conceptual diagram showing an example of a piezoelectric element in a state of compressive deformation.
Figure 4C:
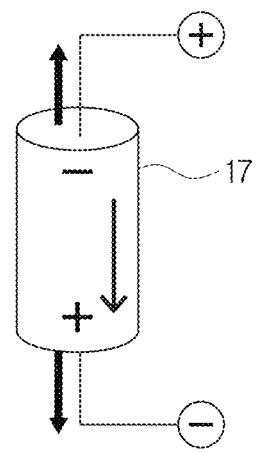
FIG. 4C is a conceptual diagram showing an example of a piezoelectric element in a state of tensile deformation.

FIG. 4A is a conceptual diagram showing the piezoelectric element 17 before deformation, FIG. 4B shows the piezoelectric element 17 in a state of compressive deformation by vibrations generated from micro whirling motions of the bearing, and FIG. 4C shows the piezoelectric element 17 in a state of tensile deformation by vibration generated from micro whirling motions of the bearing.

Additionally, the piezoelectric element 17 may be electrically connected to a sensor or a communication module to supply the produced electricity to the sensor or the communication module.

On the other hand, when the piezoelectric element 17 does not need to produce electricity, the piezoelectric element 17 is used as an actuator upon receiving electricity, to convert damping forces at high speed in response to high frequency vibrations of the bearing 5.

For example, the piezoelectric element 17 may be PZT, but is not necessarily limited thereto, and may be various configurations that produce electricity while damping the vibrations generated from the bearing 5 by deformation upon receiving the radial forces.

The piezoelectric element 17 may be also electrically connected to a vibration detection sensor (not shown), and the vibration detection sensor is a sensor for detecting the vibrations of the bearing. The vibration detection sensor allows self-power generation upon receiving electricity produced by the piezoelectric element 17.

In the same way as the piezoelectric element, a plurality of first elements 15 may be provided, and the plurality of first elements 15 may be spaced apart from each other and two ends may be each installed in the plurality of piezoelectric elements.

Additionally, a plurality of second elements 16 may be provided, and two ends 16a of the plurality of second elements 16 may be in contact with the adjacent first elements 15.

Figure 11A:
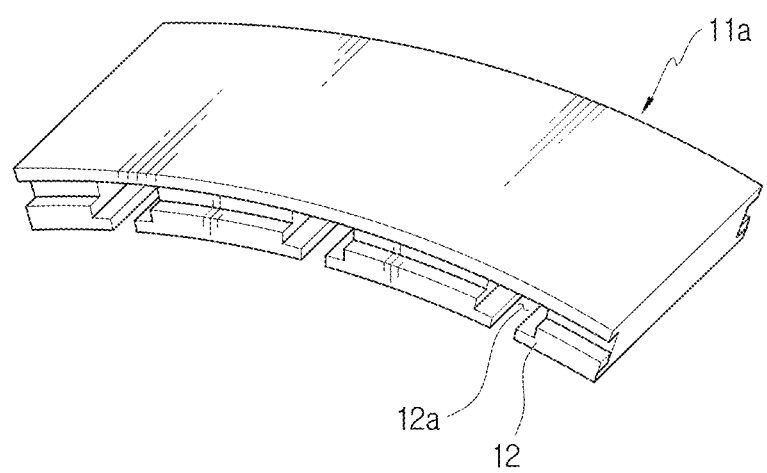
FIG. 11A is a perspective view showing an example of an outer ring of a housing.
Figure 11B:
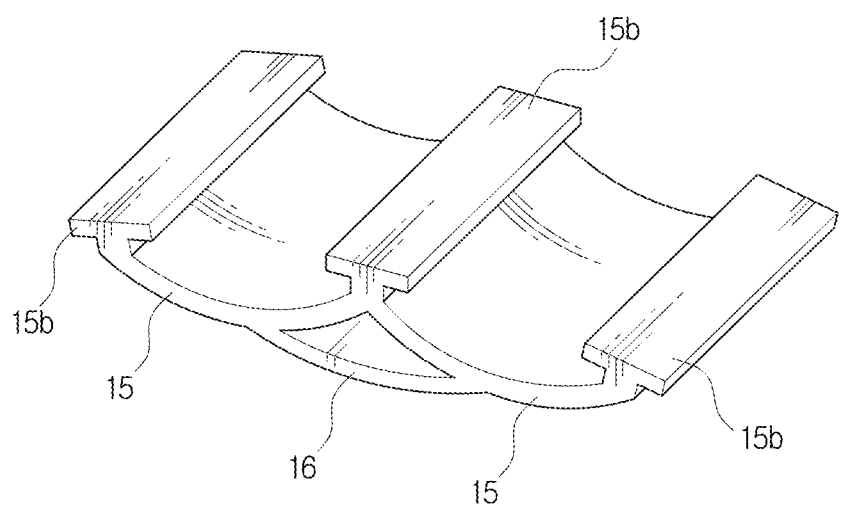
FIG. 11B is a perspective view showing an example of first and second elements of a flexible structure.
Figure 12A:
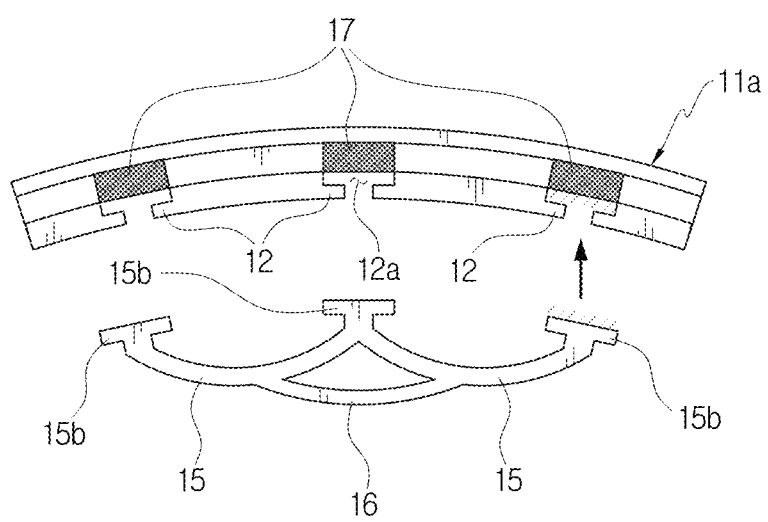
FIG. 12A is a conceptual diagram showing an example of installation of a flexible structure in an outer ring of a housing.
Figure 12B:
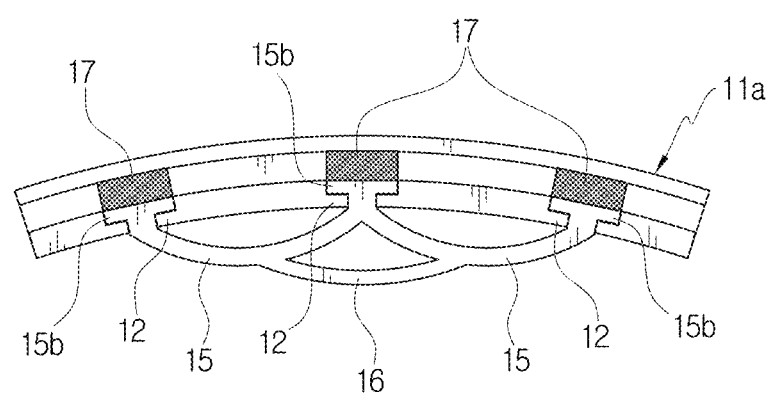
FIG. 12B is a conceptual diagram showing an example of a flexible structure installed in an outer ring of a housing.

FIG. 11A is a perspective view showing an example of the outer ring 11a of the housing 11, and FIG. 11B is a perspective view showing an example of the first and second elements 15, 16 of the flexible structure 14. Additionally, FIG. 12A is a conceptual diagram showing an example of installation of the flexible structure 14 in the outer ring 11a of the housing 11, and FIG. 12B is a conceptual diagram showing an example of the flexible structure 14 installed in the outer ring 11a of the housing 11.

Hereinafter, another example of the structure of the outer ring 11a of the housing 11 and the flexible structure 14 and another example of the piezoelectric element 17 and the flexible structure 14 installed in the outer ring 11a of the housing 11 will be described with reference to FIGS. 11A to 12B.

The outer ring 11a of the housing 11 may have a step 12 in which the first element 15 gets stuck in one surface of the outer ring 11a. Additionally, a receiving part 12a may be formed on the inner side of the step 12 to receive the piezoelectric element 17 and the end of the first element 15.

Referring to FIG. 11B, the first element 15 may have a piezoelectric support 12b at the end. The piezoelectric support 12b may be formed in the tangential direction, and may be in contact with the lower surface of the piezoelectric element 17 to support the piezoelectric element 17.

Although FIGS. 11A to 12B only show the outer ring 11a of the housing 11 and the flexible structure 14 corresponding to part of an arc, it may be understood that the shape is a circle extending along the circumferential direction in the same way as the housing 11 and the flexible structure 14 shown in FIG. 9.

Referring to FIGS. 12A and 12B, shown is an installation example in which the piezoelectric element 17 is received in the receiving part 12a of the outer ring 11a, and the piezoelectric support 12b of the first element 15 gets stuck in the step 12 to support the piezoelectric element 17. In FIG. 12A, the first element 15 may be coupled in the arrow direction, and the shaded areas may be understood as areas in which the vibrations of the bearing 5 are transmitted to the piezoelectric element 17.

The present disclosure allows the user to diagnose the condition and maintain and repair a rotating system without needing to build big data by a simpler algorithm and self-power generation.

Additionally, the present disclosure is a condition diagnosis system that enables remote damage diagnosis of the bearing through wireless communication of the frequency analysis results with the sensor that is inserted into the bearing and operates through self-power generation, and allows many users to perform condition diagnosis and predictive maintenance of the bearing wirelessly using post-processed data anywhere, thereby improving durability of the rotating system.

Additionally, the present disclosure enables the self-power generation module to fully transmit the radial and tangential forces by the micro vibrations of the bearing to the piezoelectric element within the outer ring of the bearing and the ring in surface contact, thereby minimizing energy losses and improving the power generation efficiency.

Meanwhile, the present disclosure builds an algorithm in the condition diagnosis unit to convert data derived by the behavior detection unit to data that enables condition diagnosis, and accordingly enables condition diagnosis through bearing frequency feature.

The system 100 for real-time condition diagnosis of a bearing module as described hereinabove is not limited to the configuration and method of the embodiments described above, and some or all the embodiments may be selectively combined to make various modifications.

It is obvious to those skilled in the art that the present disclosure may be embodied in other particular forms without departing from the spirit and essential features of the present disclosure. Therefore, the above detailed description should not be interpreted as being limiting in all aspects and should be considered as being exemplary. The scope of the present disclosure should be determined by the reasonable interpretation of the appended claims, and the scope of the present disclosure covers all modifications within the equivalent scope of the present disclosure.

What is claimed is:

1. A system for real-time condition diagnosis of a bearing module, comprising:
    a self-power generation module installed in an outer ring of a bearing to generate electricity using vibration generated from a micro whirling motion of the bearing;
    a behavior detection unit installed in the bearing to detect behavior information of the bearing in real time;
    a wireless transmission module connected to the behavior detection unit to transmit the real-time detected behavior information of the bearing to an external device; and
    a condition diagnosis unit that receives the behavior information of the bearing transmitted from the wireless transmission module and diagnoses condition of the bearing in real time,
    wherein the real-time behavior information of the behavior detection unit installed in the bearing is transmitted through the electricity obtained by the self-power generation module,
    wherein the self-power generation module comprises:
        a housing that is in contact with the outer ring of the bearing to receive the vibration generated from the micro whirling motion of the bearing, and has a receiving space therein;
        a flexible structure that is disposed in the receiving space while being in contact with an inner circumference of the housing to convert the vibration into a radial direction; and
        a piezoelectric element that is installed between the housing and the flexible structure and disposed near the receiving space, and deforms upon receiving the vibration converted in the radial direction from the flexible structure, thereby producing electricity,
        wherein the flexible structure comprises:
            a first element that is formed in an arc shape and installed in the piezoelectric element with two ends being connected to one surface of the housing; and
            a second element that is formed in an arc shape and disposed in contact between the first element and the other surface of the housing.

2. The system for real-time condition diagnosis of a bearing module according to claim 1, wherein the behavior detection unit is an accelerometer sensor installed in the bearing to detect the behavior information generated by rotation and vibration of the bearing.

3. The system for real-time condition diagnosis of a bearing module according to claim 1, wherein a plurality of piezoelectric elements is provided, and the plurality of piezoelectric elements is arranged in the housing, spaced apart from each other,
    a plurality of first elements is provided, and the plurality of first elements is spaced apart from each other and has two ends each installed in the plurality of piezoelectric elements, and
    a plurality of second elements is provided, and the plurality of second elements has two ends in contact with adjacent first elements.

4. The system for real-time condition diagnosis of a bearing module according to claim 2, wherein the condition diagnosis unit is configured to receive the behavior information of the bearing detected by the accelerometer sensor from the wireless transmission module, and includes a damage diagnosis module to diagnose damage of the bearing through a frequency analysis algorithm based on the behavior information of the bearing and a predictive repair diagnosis module to predict repair.

5. The system for real-time condition diagnosis of a bearing module according to claim 4, wherein the damage diagnosis module performs Ball Pass Frequency of the Outer race (BPFO), Ball Pass Frequency of the Inner race (BPFI), Fundamental Train Frequency (FTF) and Ball Spin Frequency (BSF) through Fast Fourier Transform (FFT).

6. The system for real-time condition diagnosis of a bearing module according to claim 1, wherein the condition diagnosis unit is implemented through a mobile terminal, and the wireless transmission module is a wireless Internet module or a short range communication module that enables wireless communication with the mobile terminal.

7. The system for real-time condition diagnosis of a bearing module according to claim 6, wherein the mobile terminal is a smart phone in which an application including the condition diagnosis unit is installed, and
    the application has a damage diagnosis module to diagnose damage of the bearing through a frequency analysis algorithm based on the behavior information of the bearing transmitted from the wireless transmission module and a predictive repair diagnosis module to predict repair.

* * * * *